United States Patent [19]

Kodokian

[11] Patent Number: 5,928,577
[45] Date of Patent: Jul. 27, 1999

[54] SPHERICAL PARTICLES OF A COATING COMPOSITION

[75] Inventor: George Kevork Kodokian, Wilmington, Del.

[73] Assignee: E. I. du Pont de Nemours and Company, Wilmington, Del.

[21] Appl. No.: 08/835,554

[22] Filed: Apr. 8, 1997

[51] Int. Cl.⁶ ............................................. B29B 9/10

[52] U.S. Cl. ............................................. 264/15

[58] Field of Search ............................. 264/15, 9

[56] References Cited

U.S. PATENT DOCUMENTS 3,933,954  1/1976  Gebhard, Jr. et al. .................. 264/15
5,472,649  12/1995  Chang et al. ........................... 264/15

*Primary Examiner*—Mary Lynn Theisen
*Attorney, Agent, or Firm*—James A. Costello; Sudhir G. Deshmukh

[57] ABSTRACT

Spherical particles of a copolymer composition comprising a crosslinker and/or coating additive(s) the particles being especially useful for coating various substrates; and an improved process for making such particles comprising forming the copolymer and unreacted crosslinker and/or other additives in a coating matrix.

9 Claims, No Drawings

SPHERICAL PARTICLES OF A COATING COMPOSITION

BACKGROUND OF THE INVENTION

1. Field of the Invention

This invention relates to a method of producing spherical-shaped particles of copolymers and one or more coating additives and/or crosslinkers, the particles being useful for coating substrates; and to the particles themselves.

2. State of the Art

This invention is an improvement in the process described in U.S. Pat. Nos. 4,056,653 and 3,933,954. The improvement comprises forming substantially spherical particles that contain the coating copolymer and other additives typically employed in coatings of such copolymer. The problem solved by the improved process is how to produce spherical particles having varied components, in addition to copolymer, from a broader range of copolymers than suggested by the cited patents. Application of such particles to a substrate (for instance, in a fluidized bed) produces coatings ready to be crosslinked by art—recognized means into durable, aesthetically pleasing surfaces resistant to chemical attack and delamination. Heretofore, spherical particles such as described have not been known. Careful selection of particle components and the time/temperature profile employed during particle formation insures ready application of all necessary coating components to the substrate from the spherical particle matrix containing them, in a single fluidized bed immersion step.

SUMMARY OF THE INVENTION

This invention concerns an improved process for producing substantially spherical particles of a copolymer comprising the steps:

i) shearing, under pressure and at an elevated temperature, a surfactant and components of a crosslinkable copolymer to form a homogeneous aqueous slurry of particles;

ii) agitating the slurry under pressure at a temperature above the melting point of the copolymer to make the particles substantially spherical;

iii) cooling and agitating the slurry, to a temperature below the melting point of the copolymer;

wherein the improvement comprises:

a) adding to the components in step i at least one member selected from the group consisting of coating additive(s) and crosslinker;

b) employing a time/temperature profile in steps i and ii to prevent a significant degree of crosslinking during formation of the particles;

c) optionally adding an additional surfactant to step i in an amount sufficient to form substantially spherical particles of a crosslinkable combination of copolymer, coating additive(s) and crosslinker.

By "substantially spherical" is meant that the particles comprise a uniform and smooth radius of curvature. By "time/temperature profile" is meant that lower temperatures can be employed for longer times and higher temperatures for shorter times, all within the temperature ranges and times discussed hereafter. The balance of time/temperature is important to avoid significant (more than, say, about ten percent) reaction of the crosslinker with the copolymer before such crosslinking is desired, which is after application of the particles to the substrate to be coated. Under certain conditions, however, up to 40 percent of the crosslinker can be permitted to react. It is most preferred that no more than about 5% be reacted.

A preferred process of this invention employs as the coating polymer a copolymer of an olefinically unsaturated compound and a carboxylic acid. Another embodiment comprises adding to step i one or more additives selected from a pigment, an anticorrosion agent, catalyst, ultraviolet light stabilizer, antioxidant, flow agent, leveling agent and the like.

Another embodiment comprises employing in step c, a surfactant selected from at least one member of the group consisting of ionic and nonionic surfactants. Preferred ionic surfactants are formed in situ by the reaction of one or more of ammonium hydroxide, triethanolamine, morpholine and dimethyl ethanolamine with the carboxyl functionality integral to the copolymer. Preferred nonionic surfactants are polyoxypropylene-polyoxyethylene block copolymer, alkylphenol thioxylates, and ethyleneoxide-propylene glycol polymers. Other ionic and nonionic surfactants can be employed as will readily suggest themselves to one skilled in the art having this disclosure as guidance.

In its compositional aspect, this invention concerns a substantially spherical particle of a coating composition comprising a copolymer and at least one member selected from the group consisting of pigment, crosslinker, surfactant, catalyst, ultraviolet light stabilizer, antioxidant, flow agent and leveling agent. Preferred crosslinkers are melamine and those that contain epoxide functionality such as bisphenol A diepoxy (blocked or unblocked) and triglycidyl isocyanurate.

Preferred copolymers are selected from the group consisting of unfunctionalized or hydroxy-functionalized poly (ethylene/methacrylic acid) and poly(ethylene/acrylic acid).

Typically, a crosslinker is employed in the stoichiometric range of about 1:0.05 to 1:1.5 with respect to the acid group in the base resin. Preferably, the range is between 1:0.1 to 1:1. The range of acid in the base resin before crosslinking is between about 1 and 30 percent by weight of the ethylene. Preferably, the range is between 4 to 20 percent. The hydroxy functionality in the base resin before crosslinking is between about 0 to 30 percent by weight of the ethylene. Preferably, the range is between 2 to 10 percent.

The ionic surfactant is about 0 to 15 percent by weight of the resin, preferably between about 0.01 to 5 percent. In addition, the nonionic surfactant is about 0 to 25 percent by weight of the resin. Preferably, the range is about 0.1 to 10 percent.

The relationship of time and temperature is important to ensure the resin does not react/crosslink prematurely. The temperature range is maintained at about 60° to 180° C.; preferably, between 90° to 150° C. The time at temperature is another variable, and depends on the crosslinker. For the preferred crosslinkers, the time at temperature range is between 10 seconds to 1 hour; preferably, between 1 minute to 30 minutes. Most preferably, the time is between 2 to 15 minutes. A minimum of about 2 minutes is needed to ensure that ammonium hydroxide or other ionic surfactant-forming component reacts with the acid-containing copolymers.

With respect to other additives that can be incorporated into the spherical particles by the described process, the following guidelines are offered, and will be readily appreciated by one skilled in the art. Anti-oxidants such as cinnamate- and phosphite-based anti-oxidants can be employed, generally at levels of about 0 to 5% by weight. Standard ultraviolet light absorbers and free-radical scavengers can be employed at levels of about 0 to 3%, leveling agents at 0 to 2%, and anti-popping agents at 0 to 5%.

Specifically with respect to pigment, the composition can contain up to 50% by weight of pigment based on weight of the film-forming components of the coating composition. Any organic and inorganic pigments can be used including phthalocyanine blue; carbon black; metal oxides such as titanium dioxide, zinc oxide, and iron oxide; metallic powders; metal hydroxides and mica flakes.

DETAILS OF THE INVENTION
The Process Aspects

Substantially spherical particles having a rough surface can be prepared by a method which comprises shearing in a closed shear zone of a shear device under positive pressure: water, surfactant(s) and copolymer. Preferably, the copolymer is selected from one or more α-olefins of the formula R—CH=CH$_2$, wherein R is a radical of hydrogen or an alkyl radical having from 1 to 8 carbon atoms, copolymerized with one or more α,β-ethylenically unsaturated carboxylic acids having from 3 to 8 carbon atoms, said copolymer being a direct copolymer of the α-olefins and the unsaturated carboxylic acid in which the carboxylic acid groups are randomly distributed over all molecules and in which the α-olefin content of the copolymer is at least 50 mol percent, based on the α-olefin-acid copolymer. The unsaturated carboxylic acid content of the copolymer is from 0.2 to 25 mol percent, based on the α-olefin-acid copolymer, and any other monomer component optionally copolymerized in said copolymer.

Shearing is effected at a temperature above the melting point but below the thermal degradation point of the polymer to form a homogeneous slurry wherein the polymer particles have an average particle size of less than 100 microns in diameter, the slurry containing at least 0.01% by weight of surfactant and up to 40% by weight of said polymer; after completion of shearing, maintaining the slurry with agitation at a temperature above the polymer melting point for at least 0.5 minute until essentially all the polymer particles become spherical; while continuing agitation cooling the slurry to a temperature below about 80° C. in a period of at least 0.3 minute, the pressure maintained being sufficient to keep the water in the liquid state; simultaneous with or subsequent to cooling the slurry reducing the pressure of said cooled slurry to atmospheric pressure; and separating the polymer particles.

The process of this invention should be broadly understood to employ ionic surfactants prepared in situ and/or nonionic surfactants and/or external surfactants such as ammonium lauryl sulfate, and the like. The spherical-shaped particles have an average diameter of 10 to 100 microns whose surface can be rough, dimpled and covered with hemispherical bumps about 0.1 micron in diameter.

To prepare the spherical coating composition of this invention, a slurry mixture is prepared of water, surfactant and/or ionic and/or nonionic copolymers (including terpolymer), together with any other additives typically employed in coatings of the type desired. The process can be continuous or performed in a batch operation. In the continuous operation the slurry is maintained external to the shear device. In the batch operation the slurry, after the shearing operation, is generally maintained in the shear device although this is not necessary. The slurry of particles is cooled from a temperature above the melting point of the polymer to a temperature below the polymer melting point. Sufficient pressure is maintained throughout the system to prevent boiling of the surfactant(s). The water, ammonia, polymer mixture together with the array of selected co-additives is constantly agitated in regions of the process where turbulent flow conditions do not exist thereby preventing separation of the ingredients into layers. The particles are separated from the surfactant(s) by conventional techniques such as filtration or centrifugation. The wet particles (powder) are then dried by conventional methods. The raw materials used in this invention, such as water, surfactant, copolymer components, additives such as pigments, crosslinker(s) and the like, are fed into the shear device either premixed or as separate streams.

When the polymer is fed separately into the shear device it can be continuously melt extruded (injected) as a ribbon or monofilament into the shearing zone. The surfactant concentration should be sufficient to prevent coalescence of particles formed in the shear device. The polymer concentration can range from about 0.5 to 50% by weight, based on the weight of the slurry. An amount of polymer below 40% is preferred since the viscosity of the slurry increases rapidly as the concentration of polymer approaches that at which the mixture would behave as a wet cake rather than a liquid.

The particles of this invention are generally less than 100 microns in size. The slurry is removed from the shear zone and is fed with agitation, first through a high temperature hold-up zone where the particles become sheared and then through a cool-down zone. Simultaneous with or after cooling, the pressure is reduced to atmospheric pressure, the slurry is passed into a receiver, and the particles are separated from the aqueous ammonia.

Suitable olefins include ethylene, propylene, butene-1, pentene-1, hexene-1, heptene-1, 3-methylbutene-1, and 4-methylpentene-1 and the like. Ethylene is the preferred olefin. The concentration of the α-olefins in the copolymer is preferably greater than 80 mol percent. Examples of α,β-ethylenically unsaturated carboxylic acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because its chemical reactivity is that of an acid. Similarly, other α,β-monoethylenically unsaturated anhydrides of carboxylic acids can be employed. The preferred unsaturated carboxylic acids are methacrylic and acrylic acids. The concentration of acidic monomer in the copolymer is preferably from 1 to 10 mol percent.

More than one olefin can be employed to provide the hydrocarbon nature of the copolymer base. The scope of base copolymers suitable for use in the present invention is illustrated by the following two component examples: ethylene/acrylic acid copolymers, ethylene/methacrylic acid copolymers, ethylene/itaconic acid copolymers, ethylene/methyl hydrogen maleate copolymers, and ethylene/maleic acid copolymers, etc. Examples of tricomponent copolymers include: ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene, methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

In addition to the third monomer component of the copolymer stated above, additional third monomeric components can be an alkyl ester of an α,β-ethylenically unsaturated carboxylic acid of 3 to 8 carbon atoms where the alkyl radical has 4 to 18 carbon atoms. Particularly preferred are the terpolymers obtained from the copolymerization of ethylene, methacrylic acid, and alkyl esters of methacrylic acid or acrylic acid with butanol. The concentration of this optional component is 0.2 to 25 mol percent, based on the weight of copolymer, preferably from 1 to 10 mol percent. Representative examples of the third component include n-butyl acrylate, isobutyl acrylate, secondary butyl acrylate, tertiary butyl acrylate, n-butyl methacrylate, isobutyl methacrylate, sec-butyl methacrylate, t-butyl methacrylate, n-pentyl acrylate, n-pentyl methacrylate, isopentyl acrylate, isopentyl methacrylate, n-hexyl acrylate, n-hexyl methacrylate, 2-ethylhexyl acrylate, 2-ethyl-hexyl methacrylate, stearyl acrylate, stearyl methacrylate, n-butyl ethacrylate, 2-ethyl hexyl ethacrylate. Also, the third component includes mono- and di-esters of 4 to 8 carbon atom dicarboxylic acids such as n-butyl hydrogen maleate, sec-butyl hydrogen maleate, isobutyl hydrogen maleate, t-butyl hydrogen maleate, 2-ethyl hexyl hydrogen maleate, stearyl hydrogen maleate, n-butyl hydrogen fumarate, sec-butyl hydrogen fumarate, isobutyl hydrogen fumarate, t-butyl hydrogen fumarate, 2-ethyl hexyl hydrogen fumarate, stearyl hydrogen fumarate, n-butyl fumarate, sec-butyl fumarate, isobutyl fumarate, t-butyl fumarate, 2-ethyl hexyl fumarate, stearyl fumarate, n-butyl maleate, sec-butyl maleate, isobutyl maleate, t-butyl maleate, 2-ethyl hexyl maleate, stearyl maleate. The preferred alkyl esters contain alkyl groups of 4 to 8 carbon atoms. The most preferred contain 4 carbon atoms. Representative examples of the most preferred esters are n-butyl acrylate, isobutyl acrylate, butyl methacrylate, isobutyl methacrylate, tertiary butyl acrylate, tertiary butyl methacrylate.

The copolymers after polymerization but prior to ionic crosslinking (if desired) can be further modified by various reactions to result in polymer modification which do not interfere with crosslinking. Halogenation of an olefin acid copolymer is an example of such polymer modification. The preferred base copolymers are those obtained by the direct copolymerization of ethylene with a monocarboxylic acid comonomer. The melt index of the polymer generally ranges from 0.1 g/10 minutes to 3000 g/10 minutes, preferably 10 to 2000 g/10 minutes.

The temperature of the polymer as it is fed into the shear device depends on the particular polymer used and includes temperatures as low as about 90° C. and as high as 228° C. The polymer feed temperature within the required range has essentially no effect on the final product. The temperature of the water will be above the melting point of the polymer. The maximum temperature available at reasonable pressure, i.e., about 500 psi is 240° C. Temperatures from about 90° C. to 150° C. have proved to be useful in producing particles of the required size.

The pressure of the system throughout the process must be above the vapor pressure of the slurry to prevent boiling of the liquid phase. The specific shear rate used has little effect on particle size, provided that the water/surfactant/polymer slurry remains in the shear zone for a sufficient time for the polymer particles to reach equilibrium size. This size is determined by the interactions of the constituents. The equilibrium size is reached quickly at high shear rates but long exposure of the slurry to shear is required when the shear rate is low.

After completion of the shearing, the slurry passes or is removed from the shearing zone. In the batch process, the slurry can be maintained in the shear device although is can be placed in another vessel, provided the slurry temperature is maintained above the polymer melting temperature. In the continuous process, the slurry is maintained external to the shear device. It has been found that high temperature hold-up time is necessary for surface tension to pull melted particles into spherical shapes. The water/surfactant/polymer slurry is agitated sufficiently to prevent the separation of polymer and the aqueous layer and to minimize particle to particle contact. It is undesirable that the particles become agglomerated. Separation of the slurry into two layers can also be prevented by maintaining turbulent flow during hold-up. If the product does not become substantially spherical during the hold-up time, additional hold-up time can be used at the same or different temperature.

The slurry is cooled to a temperature below the polymer melting point, i.e., about 70° to 80° C. with agitation, preferably mild, to prevent separation of the ingredients in the aqueous layer and agglomeration of the particles. The cooling down of the slurry permits easy product isolation by filtration or other means. The cool-down of the slurry can be effected in such a manner that particle surfaces are formed with varying degrees of surface roughness. The pressure on the system can be reduced simultaneous with or immediately after cooling or can be accomplished at any convenient rate, time or location after the high temperature hold-up, provided the product is maintained in a single phase. Additional process details can be found in U.S. Pat. No. 3,933,954 and additional particle details can be found in U.S. Pat. No. 4,056,653.

Utility of the Spherical Particles of This Invention

One method for employing the spherical particles of this invention is in a fluidized bed to coat substrates as follows:

i) heating the substrate to a temperature sufficient to tackify the polymer particles upon contact with the substrate;

ii) maintaining particle temperature in the fluidized bed below that at which the particles tackify;

iii) covering substantially uniformly all surfaces of the substrate;

iv) optionally heating the coated substrate to level the coating and to cure the polymer if it is thermosetting; and v) controlling the coating thickness, per unit time, in this manner:

(a) to obtain relatively thin coatings of up to about 150 micrometers, heat the substrate such that the coating temperature is within the tack temperature gradient but below Tm and maintain particle sizes so that at least 80 weight percent are between 10 to 80 micrometers;

(b) to obtain thicker coatings, heat the substrate above the tack temperature gradient, employ larger particle sizes than described immediately above, or both.

The buildup in coating thickness is believed to result primarily from substrate heating profiles above the tack temperature gradient of the polymer. By "tack temperature" (Tt) is meant the substrate temperature just high enough to cause the polymer particles to adhere thereto. The "tack temperature gradient" comprises a temperature range whose lower limit is the tack temperature and whose upper limit is about 75° C. higher, provided it remains below Tm (melt temperature). One skilled in the art will appreciate that Tm has relevance with respect to crystalline and semicrystalline polymers, not amorphous polymers. Accordingly, when an amorphous polymer has been selected as the coating, the important considerations, so far as temperature is concerned, are Tt and tack temperature gradient.

It is preferred to control coating thickness to obtain thicknesses of 150 micrometers or less on galvanized steel, treated or untreated; a substrate having a curved shape with recesses; a substrate which is an automobile body or component thereof; in which the polymer is semicrystalline thermoplastic or semicrystalline thermosetting or amorphous thermoplastic or amorphous thermosetting. When the polymer is thermosetting, the substrate to be coated is immersed into the fluidized bed at a temperature that is controlled so as to effect adherence of the polymer but without substantial crosslinking while the substrate is within the bed.

It is preferred to coat a substrate of a vehicle body or component thereof having a curved shape and recesses comprising: i)applying a coating to the substrate by immersing the heated substrate into a fluidized bed of particles and adhering the particles substantially uniformly to all surfaces of the substrate to produce a coating with an average thickness not exceeding about 150 micrometers; ii) optionally applying a pigmented basecoat to the substrate coated in step i); and iii) optionally applying an unpigmented topcoat to the substrate coated in steps i) and ii).

A preferred basecoat comprises water-borne or solvent-borne polymer; a preferred clear topcoat comprises water-borne, solvent-borne or powder. The invention also concerns optionally pre-treating or post-treating the coated substrate with a primer-surfacer and/or post-treating with a colored basecoat and/or and/or clear topcoat.

The substrate can be any object that is substantially chemically stable at the operating temperature(s) of the coating process. It is preferred that the object be dimensionally stable at the operating temperature(s) to avoid any dimensional changes such as those caused by melting or warping. The substrate can be coated with one or more other coating layers before coating by this process. For instance, a metal layer such as zinc (galvanized); a corrosion resistant and/or primer layer can be employed. Preferred substrates are metals and plastics. Preferred metals are iron, steel, galvanized steel, electrogalvanized steel (one and two sides), phosphate-treated steel, electrogalvanized steel which is phosphate-treated, aluminum, and phosphate-treated aluminum. Preferred plastics are composites and compacted fibrous structures.

The temperature of the substrate as it enters the fluidized bed of polymer particles is within the tack gradient when a thin coating is desired. Generally speaking, the temperature of the substrate will decrease toward the temperature of the fluidized bath, when the substrate is in the fluidized bath. The temperature of the fluidizing gas in the fluidized bed is below the tack temperature to avoid agglomeration of polymer particles before their contact with the heated substrate.

The coating is applied in a fluidized bed of particles which are fluidized by the passage of a gas though the particles so as to form a reasonably uniform fluid mass. It is preferred that the particles in the fluidized bed are not electrostatically charged to a degree that will cause their adherence to the substrate when the substrate is below tack temperature. A coherent and substantially continuous coating will usually have a thickness of at least about 5 micrometers. Preferred coatings are about 5 to 150 micrometers thick, preferably no more than about 75 micrometers and more preferably no more than 60 micrometers. Thicker coatings of between 150 to 300 micrometers are less preferred.

Preferably, about eighty percent by weight of the coating particles are in the described size range, preferably about 20 micrometers to 60 micrometers. It is most preferred that at least 90 weight percent of the polymer particles be in these size ranges. Substantially no particles will be larger than 200 to 250 micrometers. The particle size of the polymer is measured by the general technique described by Heuer, et al, Part. Charact., Vol. 2, pages 7 to 13 (1985). The measurement is made using a Vario/LA Helos analyzer available from Sympatec, Inc., 3490 U.S. Route 1, Princeton, N.J. 08540, U.S.A., using the volume percent measurement.

After removal from the fluidized bed, the coated substrate can be heated above the tack temperature gradient of the polymer to level the coating and effect cure if it is a thermosetting polymer. This is carried out in a typical heating apparatus such as a convection or infrared oven. If the polymer is thermosetting, it is preferred that substantial curing not take place before leveling has taken place. The time required for leveling will depend on the particle size, distribution, thickness, temperature used and the viscosity of the polymer. Higher temperatures and lower polymer viscosities favor faster leveling.

The coatings produced by the instant process are useful to impart chemical resistance, and other desirable properties such as will readily occur to one skilled in the art. They can act as primers for a subsequent coating layer and/or provide pleasing aesthetic properties such as color, smoothness, and the like. To provide such advantages, it can be useful to include with or within the polymer particles other materials typically employed in polymer coatings such as fillers, reinforcers, pigments, crosslinkers, surfactants, colorants, antioxidants, leveling agents, antiozonants, UV absorbers, stabilizers, and the like. In many instances, coating attributes depend on good adhesion of the polymer coating to the substrate. Such adhesion can often be improved by commonly known methods such as use of a primer, cleaning of the substrate surface, chemical treatment of the substrate surface and/or modification of the chemical makeup of the coating being applied.

The particles of this invention are useful in many applications, such as the coating of coil stock, automotive, truck and vehicle bodies, appliances, ceramic parts, plastic parts, and the like. For instance, for automotive bodies, the spherical particles can be applied directly onto the metal surface or a primer can be applied first. One or more coating layers of typical finish coats such as a so-called (usually colored) basecoat, and then a clearcoat can be applied. Care should be taken to insure adequate adhesion between the various coats, and between the polymer coat and the metal body.

Generally, the temperature of the substrate (and the composition to be coated on it) will decrease toward the temperature of the fluidized bath, when the substrate is in the fluidized bed. Preferred operating conditions include substrate temperatures of about 20° C. or more above Tt, not significantly exceeding about 40° C. or more above Tt (but below Tm). The temperature of the substrate as it enters the fluidized bed (at a temperature above the tack temperature) together with the appropriate size selection of coating particles largely governs the coating thickness independent of time, after a critical minimum dip time in the fluidized bed.

EXAMPLES

The following representative ingredients in the recited weights can be incorporated by the process of this invention into spherulized particles of coating composition.

TABLE

Typical Formulation

| MATERIAL | FUNCTION | WEIGHT |
|---|---|---|
| Nucrel ® | Binder | 100.00 |
| Cardura E | Binder | 19.50 |
| Bisphenol A epoxy | Binder | 5.00 |
| TBPB | Catalyst | 0.60 |
| $TiO_2$ | Pigment | 3.25 |
| $BaSO_4$ | Pigment | 3.25 |
| Carbon | Pigment | 0.07 |
| Nalzin ® 2 | Pigment | 2.60 |
| Cyasorb ® 531 | UV absorber | 0.77 |
| Irganox ® 1010 | Anti-oxidant | 1.30 |
| Irgafos ® | Anti-oxidant | 0.13 |
| Benzoin | Anti-pinhole | 0.65 |
| Modaflow 2100 | Flow & Levelling | 0.80 |
| | Total | 137.92 |

| MATERIAL | CHEMICAL NAME |
|---|---|
| Nucrel ® | Poly(ethylene-co-methacrylic acid), 10% methacrylic acid, 850 M.I. |
| Cardura E | Glycidyl ester of tertiary carboxylic acid |
| Bisphenol A epoxy | 4,4'-(1-methylylidene)-bis-1,1'-oxypropyloxirane-2,3 |
| TBPB | Tetrabutylphosphonium Bromide |
| $TiO_2$ | Titanium Dioxide |
| $BaSO_4$ | Barium Sulfate |
| Carbon | Carbon Black Powder |
| Nalzin ® 2 | Zinc phospho oxide complex |
| Cyasorb ® 531 | 2-Hydroxy-4-n-octoxybenzophenone |
| Irganox ® 1010 | Tetrakis(methylene(3,5-di-t-butyl-4-hydroxy)hydrocinnamate) methane |
| Irgafos ® 168 | Tris(2,4-di-t-butylphenyl)phosphite |
| Benzoin | Benzoylphenylcarbinol |
| Modaflow 2000 | Poly(ethylacrylate-co-2-ethylhexylacrylate)/Silica |

Example 1

The ingredients in the Table, in the proportions shown, were blended to a uniform mixture in an extruder; 200 grams of this blend were added to a 1500 ml autoclave equipped with a shear device to which had been added 2.6 grams concentrated ammonia, 20 grams polyoxypropylene-polyoxyethylene surfactant, and 777 grams of deionized water. This mixture was sheared at 125° C. for 5 minutes, then allowed to cool with mixing. The material was isolated by filtration and then dried to give a powder consisting of substantially spherical particles.

Example 2

Nucrel® (950 parts) and Nalzin® 2 pigment (50 parts) were blended to a uniform mixture in an extruder; 200 grams of this blend were added to a 1500 ml autoclave, equipped with a shear device, to which had been added 13 grams concentrated ammonia and 787 grams of deionized water. This mixture was sheared at 125° C for 3 minutes, then allowed to cool with mixing. The material was isolated as in Example 1.

Example 3

Procedure as in Example 2 except residence time was 120 minutes.

Example 4

Nucrel® (1000 parts) and titanium dioxide (100 parts) were blended to a uniform mixture in an extruder; 200 grams of this blend were added to a 1500 ml autoclave, equipped with a shear device to which had been added 40 grams of polyoxypropylene-polyoxyethylene surfactant, 2.6 grams of concentrated ammonia and 757 grams of deionized water. This mixture was sheared at 110° C. for 3 minutes, then allowed to cool with mixing. The material was isolated as in Example 1.

Example 5

Nucrel® (1000 parts) and calcium carbonate (100 parts) were blended to a uniform mixture in an extruder; 200 grams of this blend were added to a 1500 ml autoclave equipped with a shear device to which had been added 40 grams of polyoxypropylene-polyoxyethylene surfactant, 2.6 grams concentrated ammonia and 757 grams of deionized water. This mixture was sheared at 110° C. for 3 minutes, then allowed to cool with mixing. The material was isolated as in Example 1.

What is claimed is:

1. This invention concerns an improved process for producing substantially spherical particles of a copolymer comprising the steps:
   i) shearing, under pressure and at an elevated temperature, a surfactant and components of a crosslinkable copolymer to form a homogeneous aqueous slurry of particles;
   ii) agitating the slurry under pressure at a temperature above the melting point of the copolymer to make the particles substantially spherical;
   iii) cooling and agitating the slurry, to a temperature below the melting point of the copolymer;
   wherein the improvement comprises:
   a) adding to the components in step i at least one member selected from the group consisting of coating additive and crosslinker;
   b) employing a time/temperature profile in steps i and ii to prevent a significant degree of crosslinking during formation of the particles;
   c) optionally adding an additional surfactant to step i in an amount sufficient to form substantially spherical particles of a crosslinkable combination of copolymer, coating additive and crosslinker.

2. A process according to claim 1 wherein the polymer is a copolymer of an olefinically unsaturated compound and a carboxylic acid.

3. A process according to claim 2 wherein the olefinically unsaturated compound is selected from the group of olefins of the formula $R\text{---}CH\text{=}CH_2$, where R is a radical selected from the subgroup consisting of hydrogen and alkyl radicals having from 1 to 8 carbon atoms, and the carboxylic acid is selected from alpha, beta-ethylenically unsaturated carboxylic acids having from 3 to 8 carbon atoms.

4. A process according to claim 1 comprising adding, in step i, one or more additives selected from a pigment, ultraviolet light stabilizer, antioxidant, flow agent and leveling agent.

5. A process according to claim 1 comprising employing, in step c, a surfactant selected from at least one member of the group consisting of ionic and nonionic surfactants.

6. A process according to claim 5 wherein the ionic surfactant is formed from at least one member of the group selected from ammonium hydroxide, triethanolamine, dimethyl ethanolamine and morpholine reacted with the carboxyl functionality of the copolymer.

7. A process according to claim 5 wherein the nonionic surfactant is selected from at least one member of the group polyoxypropylene-polyoxyethylene block copolymer, alkylphenol thioxylate and ethylene oxide-propylene glycol polymer.

8. A process according to claim 1 comprising adjusting the time/temperature profile to minimize reaction of the crosslinker with itself, the copolymer and the additives present in the composition.

9. The improved process of claim 1 wherein said time/temperature profile provides for maintaining the temperature of said slurry to 60° C. to 180° C. for 1 hour to 10 seconds.

* * * * *